No. 642,885. Patented Feb. 6, 1900.
A. SWASEY.
ROLLER FEED FOR SCREW MACHINES.
(Application filed Aug. 18, 1899.)

(No Model.) 2 Sheets—Sheet 1.

Witnesses.
E. B. Gilchrist
H. W. Wise

Inventor.
Ambrose Swasey,
By his Attorneys,
Thurston & Bates

No. 642,885.

A. SWASEY.
ROLLER FEED FOR SCREW MACHINES.
(Application filed Aug. 18, 1899.)

Patented Feb. 6, 1900.

(No Model.)

2 Sheets—Sheet 2.

UNITED STATES PATENT OFFICE.

AMBROSE SWASEY, OF CLEVELAND, OHIO, ASSIGNOR TO WARNER & SWASEY, OF SAME PLACE.

ROLLER-FEED FOR SCREW-MACHINES.

SPECIFICATION forming part of Letters Patent No. 642,885, dated February 6, 1900.

Application filed August 18, 1899. Serial No. 727,659. (No model.)

*To all whom it may concern:*

Be it known that I, AMBROSE SWASEY, a citizen of the United States, residing at Cleveland, in the county of Cuyahoga and State of Ohio, have invented a certain new and useful Improvement in Roller-Feeds for Screw-Machines, of which the following is a full, clear, and exact description, reference being had to the accompanying drawings.

The invention relates to a screw-machine and any form of lathe having a tubular live-spindle through which a stock-rod passes and in which it is held by a chuck when being worked upon, and particularly to mechanism for feeding the stock-rod forward preferably without stopping its rotary movement in unison with the spindle.

One object of the invention is to provide simple and efficient mechanism for feeding the stock-rod forward any desired distance without imposing any sudden shock or strain upon the mechanism, such as would result, for example, from the sudden stopping of some rotating part.

Another object of the invention is to provide novel means for simultaneously adjusting the position of the feed-rolls relative to the axis of the spindle, whereby said rolls will be adapted to feed stock-rods of various diameters.

The invention consists in the construction and combination of parts hereinafter described, and pointed out definitely in the claims.

Figure 1:
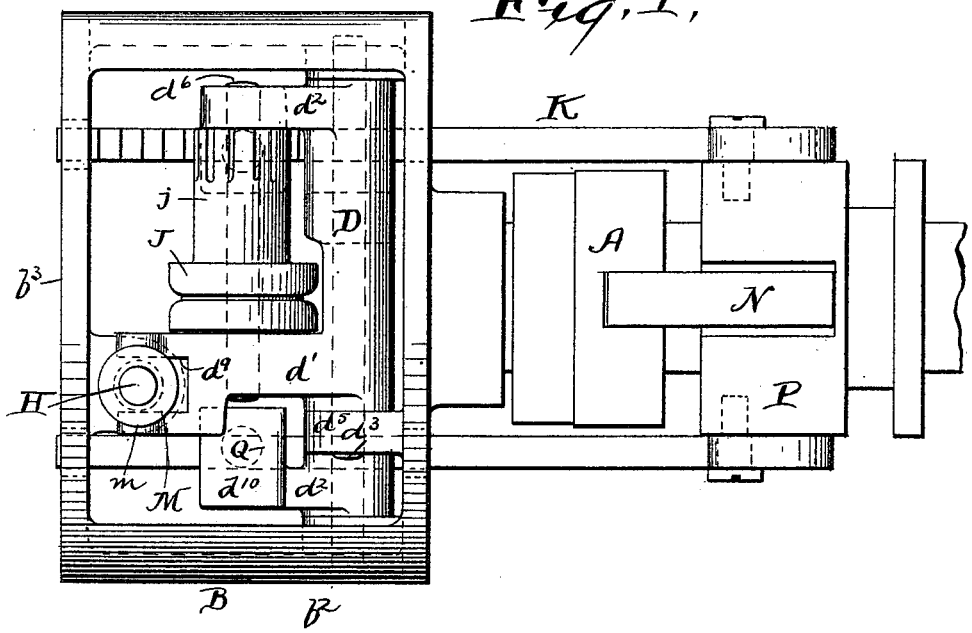
Figure 2:
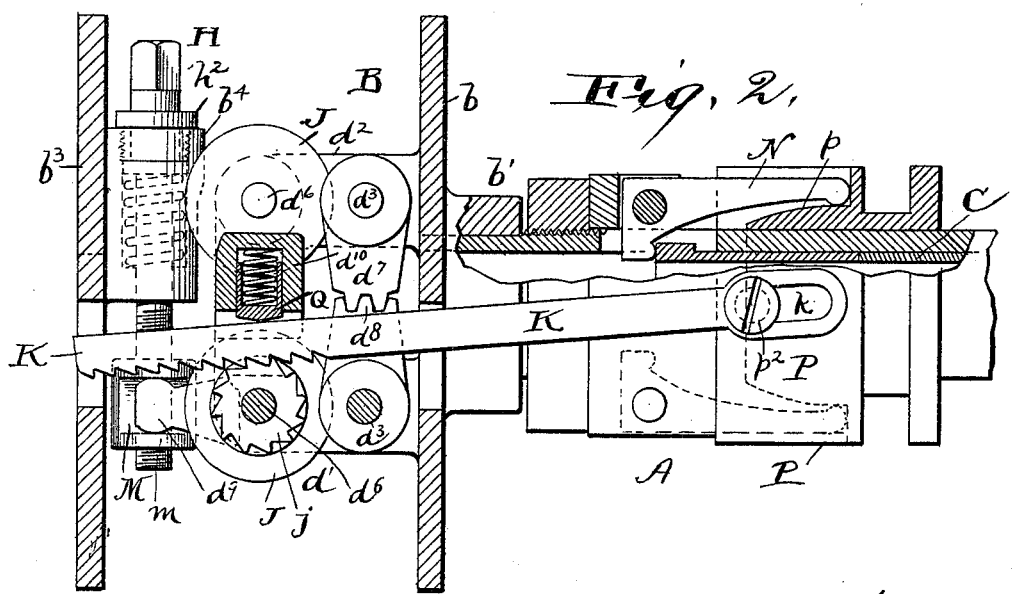

In the drawings, Figure 1 is a bottom plan view of the apparatus as shown in Fig. 2. Fig. 2 is a longitudinal sectional view of the mechanism on line 2 2 of Fig. 4. Fig. 3 is a rear end view of the device, and Fig. 4 is an end view when the end plate of the head has been cut off.

Referring to the parts by letters, A represents a rotary tubular spindle of a screw-machine or other lathe. C represents a tubular plunger which is longitudinally movable therein for the purpose of operating a chuck (not shown) of ordinary construction in the end of the spindle.

N N represent the fingers, which are pivoted to the spindle and engage with the end of said plunger to move it forward to set the chuck, and P represents a sleeve which rotates with but slides upon the spindle and has a conical end $p$, which engages with said fingers to operate them.

The parts above mentioned are of ordinary construction and well known, wherefore it is believed that it is unnecessary to show or describe them more specifically or to show or describe the bearings for said spindle and the means whereby the spindle is rotated.

On the rear end of the spindle is a chambered head B. In the particular form shown this head consists of a disk $b$, having a hub $b'$, which embraces and is made fast to the rear end of the spindle, two or more rearwardly-extended flanges $b^2$, and an end plate $b^3$, all of said parts being preferably cast in one piece. Two swinging frames D are mounted in the head, their axes being on opposite sides of the axis of the spindle and at right angles substantially thereto. These swinging frames consist of a sleeve $d$, which has two rearwardly-extended arms $d'$ $d^2$. The sleeve $d$ is loosely mounted upon a pin $d^3$, which is supported in one of the flanges $b^2$ and in an ear $d^5$ on the rear side of the disk $b$. The two arms $d'$ $d^2$ furnish the support for a cylindrical pin $d^6$, upon which and between the arms $d'$ $d^2$ is loosely mounted the feed-roller J and its extended hub $j$. As before stated, there are two of these swinging frames lying on opposite sides of the axis of the spindle, and by the rocking of said frames upon their axes the feed-rollers may be moved toward and from the axis of the spindle and the stock-rod which passes axially through the spindle. On these sleeves are respectively the gear-segments $d^7$ $d^8$, which mesh with each other, whereby the movement of either of said swinging frames upon its axis causes a simultaneous movement of the other frame in the opposite direction. The arm $d'$ is on one of these frames and extended beyond the axis of the feed-roller and is fashioned into the form of a fork $d^9$. The fork ends embrace the flattened sides of a screw-collar M and lie between the flanges $m$ on said collar. They thereby prevent the revolution of the collar when it is moved endwise, as and for the purpose hereinafter described.

A screw H passes through a spring-box $b^4$, which is formed on the inner face of the end plate $b^3$ of the chambered head and screws into this screw-collar. It is provided with a flange $h$ in the spring-box, and a coiled spring $h'$, surrounding the screw, lies between this flange and the bottom of the box, and it exerts its pressure against said flange to move the screw endwise, whereby, through the described intermediate mechanism, the feed-rollers are caused to move toward the axis of the spindle. A collar $h^2$ embraces the screw beyond this flange and screws into the spring-box, wherefore it serves as a stop limiting the spring-induced movement of said screw. The outer end of the screw is squared to receive a wrench.

It is evident from the foregoing description that by the turning of this screw both of the frames D and the feed-rollers which they carry may be caused to move simultaneously in opposite directions toward or from the axis of the spindle and that the feed-rollers will be yieldingly held against the interposed stock-rod by the action of the spring $h'$.

The feed-rollers J are caused to rotate by means of rack-bars K, which are secured to the sliding sleeve P and engage with pinions $j'$ on the hubs of the feed-rollers. It is desired that these feed-rollers shall rotate only in the feeding direction and shall revolve in that direction only when the sleeve P is moving toward the front end of the spindle and has moved far enough to cause the release of the automatic chuck. To prevent the feed-rollers from rotating in more than one direction, ratchet devices of some suitable form must be interposed in the mechanisms which transmit motion from the sliding sleeve and the feed-rollers. In the best and simplest construction now known to me these ratchets are produced by the peculiar formation of the so-called "racks" K and pinions $j'$—that is to say, the teeth of each pinion are made in the form of ratchet-teeth and the teeth on the rack-bars are made in the form of coöperating ratchet-teeth. Each rack-bar is held in engagement with its ratchet-pinion by a spring-pressed plunger Q, which is movable in a suitable socket $d^{10}$, formed on one of the arms $d^2$, which block bears against the outer face of the rack-bar. When the ratchet rack-bars are pushed toward the rear, their teeth slip over the teeth of the ratchet-pinions, being permitted to do so by the yielding of the springs $q$, which operate the plungers Q; but when these rack-bars are moved in the contrary direction the teeth on them and on the ratchet-pinions engage and thus cause the rotation of the feed-rolls. The forward end of the rack-bars K have slots $k$, through which pass pins $p^2$, which screw into the sliding sleeve P. When the sliding sleeve is being moved toward the forward end of the spindle, these pins slide in these slots until the cone on the sleeve passes from under the ends of the chuck-fingers, whereby the chuck releases itself. At this instant the pins engage in the ends of the slots $k$, and a further movement of the sleeve in the same direction drives the rack-bars forward, and consequently causes the rotation of the feed-rolls in the feeding direction. If by this single forward movement of the sliding sleeve the stock-rod has not been fed forward far enough, the sleeve may be moved rearward until the cone begins to engage with the fingers, during a part of which movement the rack-bars may be moved rearward, slipping over the teeth of the ratchet-pinions. When said sleeve is again moved forward far enough, a further rotation of the feed-rolls ensues and the stock-rod is fed still further forward. When it has been moved forward as far as desired, the sliding sleeve P is then moved rearward and the cone $p$ thereon caused to operate the chuck-fingers, with the result of causing the chuck to grip the rod and hold it in the usual way.

Having described my invention, I claim—

1. In a lathe, the combination, of the tubular live-spindle, a head thereon, and feed-rolls mounted in said head on opposite sides of its axis for engaging with the stock passing through the head and spindle, with pinions operatively connected with said feed-rolls, and rack-bars engaging with said pinions, substantially as and for the purpose specified.

2. In a lathe, the combination of the tubular live-spindle, a head thereon, swinging frames hung in said head on opposite sides of its axis, and means for adjusting said frames to move the feed-rolls toward or from the axis of the spindle, with feed-rolls mounted in said swinging frames, pinions operatively connected with said feed-rolls, and rack-bars engaging with said pinions, substantially as and for the purpose specified.

3. In a lathe, the combination of a tubular live-spindle having a head fast on its rear end, swinging frames hung in said head on opposite sides of the axis, feed-rolls mounted in said head, and pinions operatively connected with said feed-rolls, with a sliding sleeve on the spindle, and rack-bars connected therewith and engaging with said pinions, substantially as and for the purpose specified.

4. In a lathe, the combination of a tubular live-spindle having a head on its rear end, swinging frames hung in said head on opposite sides of the axis, feed-rolls mounted in said frames, and pinions operatively connected with said feed-rolls, with a sliding sleeve on the spindle, and rack-bars engaging with said pinions and having a sliding connection with the sleeve whereby said sleeve is permitted to move a short distance before it moves the rack-bars, substantially as and for the purpose specified.

5. In a lathe, the combination of a tubular live-spindle having a head on its rear end, swinging frames hung in said head on opposite sides of the axis, feed-rolls mounted in said frame, and pinions operatively connected with said feed-rolls, with a sliding sleeve on the spindle, and rack-bars connected therewith and engaging with said pinions, a ratchet device in the chain of mechanisms between the rack-bars and feed-rolls whereby the movement of the rack-bars in one direction causes the feed-rolls to rotate, but their movement in the opposite direction does not cause said feed-rolls to rotate, substantially as and for the purpose specified.

6. The combination of a tubular live-spindle, having a head on its rear end, and two swinging frames hung in said head on opposite sides of the axis thereof and on axes which are at right angles to its axis, feed-rolls mounted respectively in said swinging frames, and means for rotating said feed-rolls, and mechanism for moving said frames simultaneously and equally upon their pivots in opposite directions toward and from the axis of the spindle, substantially as and for the purpose specified.

7. The combination of a tubular live-spindle, having a head on its rear end, two swinging frames hung in said head on opposite sides of its axis, gear-segments secured respectively to said swinging frames and engaging with each other, means for swinging one of said frames upon its axis, whereby both frames are caused to move simultaneously in opposite directions toward and from the axis of the spindle, feed-rolls mounted on said swinging frames, and means for rotating said feed-rolls, substantially as and for the purpose specified.

8. The combination of a live-spindle having a head on its rear end, two swinging frames hung in said head on opposite sides of the axis thereof, feed-rolls mounted in said swinging frames, gear-segments secured to said swinging frames respectively and engaging with each other, an arm secured to one of said swinging frames, an adjusting-screw mounted in the head, a screw-sleeve with which said adjusting-screw engages, and an arm on one of said swinging frames engaging with said screw-sleeve, substantially as and for the purpose specified.

9. The combination of a tubular live-spindle, having a head on its rear end, two swinging frames hung in said head on opposite sides of its axis, feed-rolls mounted in said swinging frames, gear-segments secured respectively to said swinging frames and meshing with each other, with an adjusting-screw passing through a spring-box, a spring acting to move the screw in one direction, stops limiting the movement thereof in said direction, a screw-collar through which said screw passes, and an arm on one of the swinging frames which engages with said screw-collar, substantially as and for the purpose specified.

10. The combination of the tubular live-spindle, a head thereon, two swinging frames mounted in said head on opposite sides of its axis, feed-rolls mounted in said swinging frames, ratchet-pinions operatively connected with said feed-rolls, a sliding sleeve, ratchet rack-bars connected with said sleeve, and springs for yieldingly holding said ratchet rack-bars in engagement with said ratchet-pinions, substantially as and for the purpose specified.

11. The tubular live-spindle, a head thereon, two swinging frames mounted in said head, each having two arms, feed-rolls mounted in said arms, ratchet-pinions connected with said feed-rolls, a sliding sleeve, ratchet rack-bars connected therewith and engaging with said ratchet-pinions, plungers movable in sockets in one arm of each engaging frame and engaging with the corresponding rack-bar, and springs operating said plungers, substantially as and for the purpose specified.

In testimony whereof I hereunto affix my signature in the presence of two witnesses.

AMBROSE SWASEY.

Witnesses:
WM. E. REED,
E. B. GILCHRIST.